Patented Aug. 2, 1932

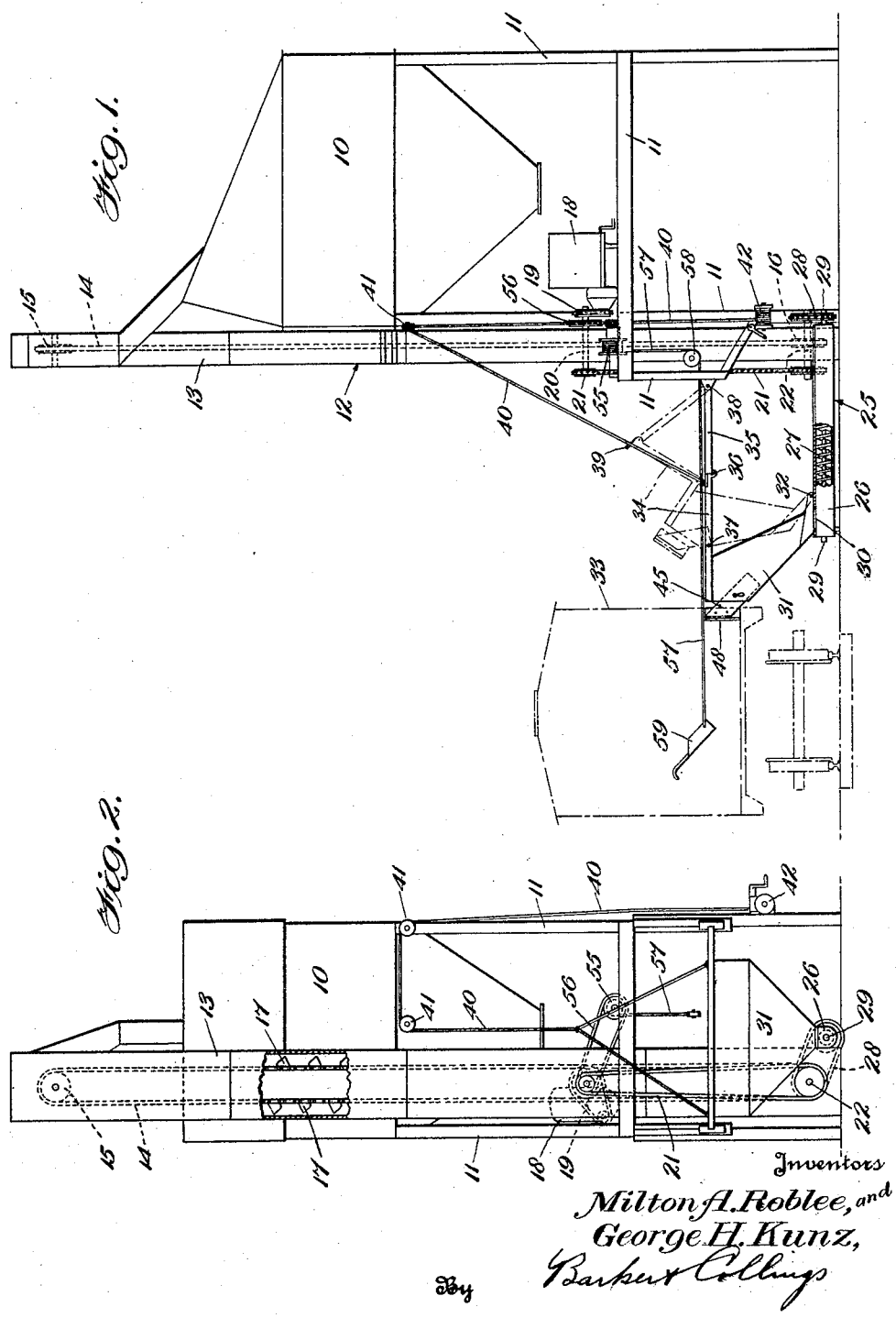

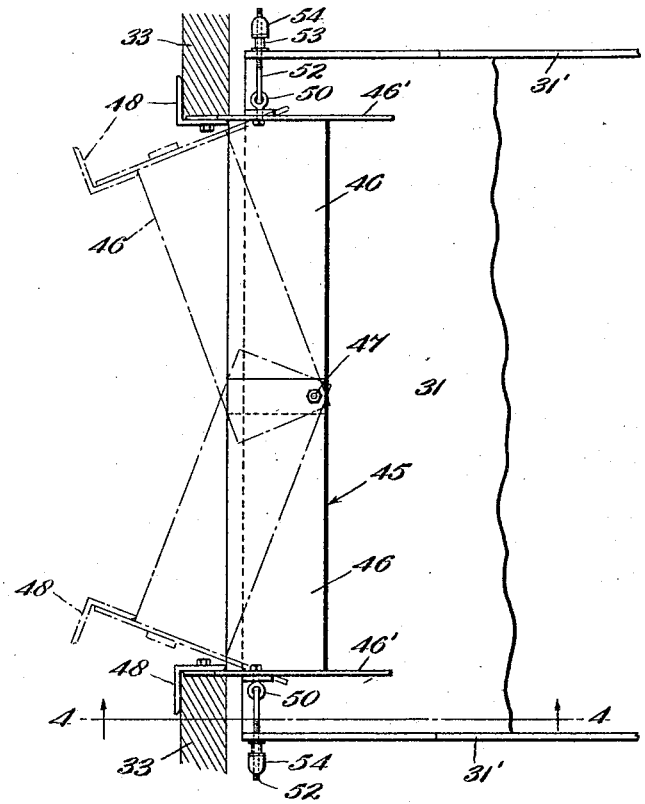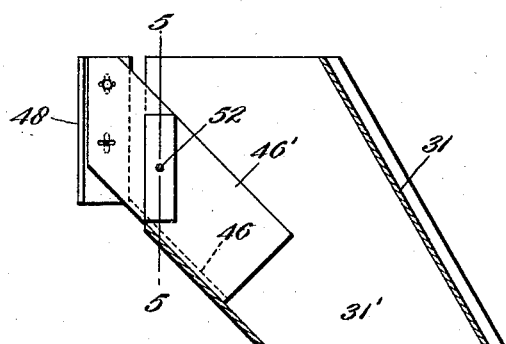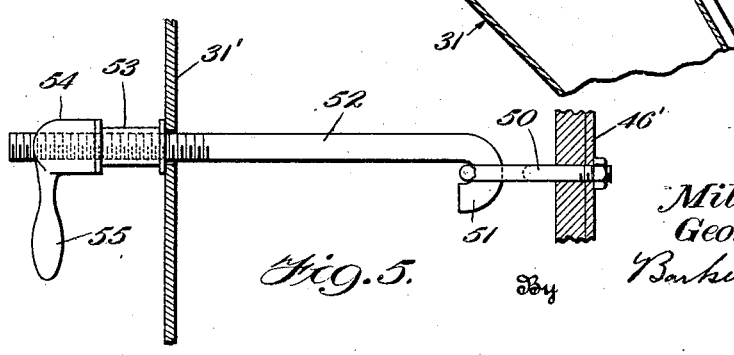

1,869,619

UNITED STATES PATENT OFFICE

MILTON A. ROBLEE AND GEORGE HENRY KUNZ, OF MILWAUKEE, WISCONSIN, ASSIGNORS TO CHAIN BELT COMPANY, OF MILWAUKEE, WISCONSIN, A CORPORATION OF WISCONSIN

APPARATUS FOR HANDLING CEMENT AND OTHER PULVERULENT MATERIALS

Application filed March 10, 1932. Serial No. 598,060.

This invention relates to apparatus for handling cement and other pulverulent, granular and analogous materials, and more particularly to an apparatus for unloading such materials from mobile vehicles such as railway cars and transferring them to storage bins, and has for one of its objects to provide an apparatus of this kind which will be simple in construction, comparatively inexpensive to manufacture and more efficient in use than those which have been heretofore proposed.

In the handling of cement, for example, it is common present day practice to load the same in bulk into closed railway cars for transportation and upon arrival at the destination to transfer the material to stationary elevated storage bins or hoppers from which the contractor may dispense the same in suitable measured quantities as occasion demands. It has also been common practice in the transferring of the material from the vehicle to the hopper to employ an elevating conveyor, usually arranged to operate in a substantially vertical plane, which conveyor is in turn fed by a horizontally disposed conveyor which is or may be of the ordinary screw type. In order to permit of the free movement of the railway vehicle it is necessary that provision be made for ready movement to a portion of the apparatus toward and from the door or discharge opening of the vehicle, and with this end in view it has been common practice to pivotally mount the horizontal feeding conveyor so that it may be swung in a substantially vertical plane from its horizontal operative position to an inclined position in which it wholly clears the railway car so that the latter may be moved to and from discharging position. Such pivoting of the feeding conveyor necessitates the provision of a relatively complicated drive therefor, and it is one of the primary objects of the present invention to provide a construction in which the feed conveyor is at all times fixed relative to the elevating conveyor and in which the complicated feeding conveyor drive above referred to is eliminated.

A further object of the invention is to provide a material handling apparatus of the class described in which the relatively fixed feeding conveyor is provided with a movable feeding chute or apron which may be swung to and from an operative position relative to the car door whereby the vehicle may be cleared by the discharging apparatus so that it may be readily moved to and from discharging position.

A still further object of the invention is to provide an auxiliary apron in conjunction with the main pivoted apron just described which is so constructed that it may be contracted or collapsed for ready introduction into the discharge opening of the vehicle and thereafter expanded to bring portions thereof into intimate engagement with the walls of the vehicle discharge opening in order that leakage of the material around the sides of the auxiliary apron may be avoided.

With the above and other objects in view which will appear as the description proceeds, the invention consists in the novel details of construction and combinations of parts more fully hereinafter described and particularly pointed out in the appended claims.

Referring to the accompanying drawings forming a part of this specification in which like reference characters designate like parts in all the views:—

Figure 1 is a side elevational view, more or less diagrammatic, of one form of apparatus constructed in accordance with the present invention;

Figure 2 is a front elevational view of the parts shown in Figure 1;

Figure 3 is an enlarged horizontal sectional elevational view of a portion of the main apron and the auxiliary apron associated therewith, the parts being shown in full lines in the operative positions they assume during discharge of the material from the vehicle;

Figure 4 is a fragmentary vertical sectional view taken approximately on the plane indicated by the line 4—4 of Figure 3; and Figure 5 is an enlarged fragmentary, vertical sectional view taken approximately on the plane indicated by the line 5—5 of Figure 4, showing one means of connecting the auxiliary and main aprons and for spreading and maintaining the auxiliary apron in operative position.

Referring more particularly to Figures 1 and 2, 10 indicates a receiving and storage bin of a well known hopper type which may be supported upon suitable framework 11. Arranged at one side of the said bin is an elevating conveyor 12 of any suitable construction, here shown as comprising a casing or housing 13 within which is mounted an endless chain 14 trained about head and foot sprockets 15 and 16 respectively and provided with buckets 17, all as will be clear from the drawings. A motor 18 is mounted upon the framework 11 and through suitable power transmitting connections, here shown as a chain and sprocket drive 19, transmits power to an auxiliary shaft 20 which in turn through a chain and sprocket drive 21 transmits power to the foot shaft 22 which carries the foot sprocket 16.

At the bottom of the elevating conveyor 12 and to one side thereof there is provided a feeding conveyor 25 which is here shown as comprising a casing 26 in which is rotatably mounted a screw 27. The casings 13 and 26 are always maintained in relatively fixed relation to one another and in order to rotate the screw conveyor 27 there is provided a chain and sprocket drive 28 from the foot shaft 22 to the shaft 29 of the screw conveyor.

In the prior constructions of this character with which we are familiar, it has been considered essential to position the feeding conveyor such as 25 at some distance above the bottom of the boot of the elevator such as 12, so as to feed the conveyed material directly into the buckets of the elevator on the upwardly traveling side. This however necessitates either the sinking of a portion of the boot into a well or pit, if the feeding conveyor be located at ground level, or else a material elevation of the feeding conveyor on supports if the bottom of the boot be at ground level. We have determined from actual trial that it is not necessary to provide this difference in level between the feeding conveyor 25 and the bottom of the elevator boot, but that on the other hand, the present apparatus works exceptionally well with both the conveyor 25 and the bottom of the elevator boot disposed at substantially ground level, as shown in Figures 1 and 2, so that the conveyor screw 27 carries the material across and forces it into the elevator casing 13 at the boot bottom level.

The right hand end of the casing 26 of the screw conveyor, as viewed in Figure 1, is in communication with the lower portion of the housing 18 of the elevating conveyor, while the left hand end of the said casing is provided with a material receiving opening 30 through which the cement or other material is fed by means of a chute or apron 31. This apron is pivotally mounted as at 32 for swinging movements from the full line position shown in Figure 1 to the broken line position shown therein, whereby it may occupy an operative position in close proximity to the sides of the railway vehicle or container 33, or it may be swung away therefrom to the broken line position to completely clear the said vehicle in order that the latter may be moved to and from its discharging position. In order to maintain the apron 31 in its full line or operative position there is provided a pair of brace members 34 and 35 which are hinged together as at 36, the other end of the member 34 being pivotally connected as at 37 to a portion of the apron 31, while the other end of member 35 is pivotally connected as at 38 to a portion of the framework 11. The member 35 may be provided with a suitable stop 39 for limiting its movement in one direction relative to its companion member 34, while free movement in the other direction is permitted, and may be accomplished through a cable 40 passing over suitable guide pulleys 41 to a hand winch or cable winding drum 42 mounted on the framework 11. Obviously by winding the cable 40 upon the drum of the winch 42 there is exerted a lifting force upon the brace members 34 and 35 to break the hinge joint 36 and move the brace members as well as the apron 31 from the full line position shown in Figure 1 to the broken line positions shown therein.

In order to provide for a relatively tight joint between the movable apron 31 and the discharge opening of the vehicle 33 whereby leakage of the cement or other material around the sides of the apron may be prevented, there is provided an auxiliary apron 45.

As best shown in Figures 3, 4 and 5, this auxiliary apron comprises a pair of members 46 which extend transversely of the opening in the wall of the vehicle 33 and are provided with upstanding side walls 46'. The transversely extending members 46 are pivotally connected together as at 47 and the outer ends of the upstanding portions 46' are provided with adjustable angle members 48. These members in the operative position of the auxiliary apron shown in full lines in Figure 3, fit around the edge of the door opening of the vehicle and in conjunction with the side members 46' and bottom members 46 provide tight joints between the auxiliary apron and the walls of the said opening whereby leakage of the cement at such points is avoided.

In order that the auxiliary apron 45 may be introduced into the discharge opening of the vehicle its parts are swung about the pivot 47 to the positions illustrated in broken lines in Figure 3 in which the angle members 48 may obviously clear the walls of the opening. After introduction into the opening in this manner the members 46 are spread or moved toward their straightened position and for bringing them into final position and maintaining them in such position, there is provided a detachable connection with the main apron 31. As here shown these connections comprise eye bolts 50 carried by the side members 46', the eyes of which are adapted to receive the hooked ends 51 of threaded rods 52 which pass through the side walls 31' of the main apron. Spacing sleeves 53 are mounted upon the projecting threaded ends of the rods 52 and outside of these sleeves there is provided the threaded nuts 54 having operating handles 55 by means of which the nuts may be manually moved to draw the rods 52 outwardly, as will be readily understood. Such outward movement of the said rods being transmitted through the hooks 51 and the eye bolts 50 to the side members 46' of the auxiliary apron completes the movement of members 46 and 48 to their full line position shown in Figure 3 and securely clamps the auxiliary apron in operative position within the door opening and relative to the main apron 31.

For moving the material within the car 33 to the aprons 45 and 31 there is provided what is commonly termed a power shovel. This device includes a winding drum 55 mounted upon the framework 11 adjacent the motor 18, which drum may be driven through a chain and sprocket drive 56 from the auxiliary shaft 20. Cable 57 is wound upon the said drum and passes around a guiding pulley or wheel 58 and thence above the brace members 34 and 35 and over the top of apron 31 to the interior of the car where its free end is connected to a scoop or shovel 59 which may be employed for scooping the cement or other material into the auxiliary apron 45 and main apron 31.

It is obvious that those skilled in the art may vary the details of construction as well as the precise arrangement of parts without departing from the spirit of the invention, and therefore it is not wished to be limited to the above disclosure except as may be required by the claims.

What we claim is:

1. In apparatus for handling pulverulent, granular and similar materials, an elevating conveyer; a feeding conveyer disposed in fixed relation to said elevating conveyer for transferring the material thereto; and an apron for conducting the material from a container to said feeding conveyer, said apron being mounted for swinging movement to and from a position to receive the material from its container.

2. In apparatus for handling pulverulent, granular and similar materials, an elevating conveyer; a substantially horizontal feeding conveyer in fixed relation to said elevating conveyer for transferring the material thereto, said feeding conveyer being provided with a casing having a material-receiving opening; and an apron for conducting the material to said feeding conveyer from a container, said apron being pivotally mounted on said casing above said opening for swinging movement from a material-receiving position adjacent the container to a position removed therefrom to permit free movement of the container.

3. In apparatus for handling pulverulent, granular and similar materials, a conveyer; a feeding apron pivotally mounted relative said conveyer, for conducting the material thereto from a container; brace members connected to said apron, for holding the same in operative position relative to said conveyer and container; and means for moving said brace members to cause said apron to swing away from said container.

4. In apparatus for handling pulverulent, granular and similar materials, a conveyer; a feeding apron pivotally mounted relative to said conveyer, for conducting material thereto from a container; hinged brace members pivotally connected to said apron and to a fixed support, for holding said apron in operative position relative to said conveyer and container; and means for breaking the hinge of said brace members and collapsing them to move said apron away from said container.

5. In apparatus for unloading pulverulent, granular and similar materials from a container having a discharge opening, a conveyer; an apron for conducting the material to said conveyer; and an auxiliary apron arranged to be introduced into said opening and to conduct the material to the main apron.

6. In apparatus for unloading pulverulent, granular and similar materials from a movable container having a discharge opening, a conveyer; an apron for conducting the material to said conveyer, said apron being mounted for movement away from said opening to permit of free movement of the container; and an auxiliary apron arranged to be introduced into said opening and to conduct material from the container to the main apron.

7. In apparatus for unloading pulverulent, granular and similar materials from a movable container having a discharge opening, a conveyer; an apron for conducting the material to said conveyer, said apron being mounted for movement away from said opening to permit of free movement of the container; and an auxiliary apron arranged to be introduced into said opening and to conduct material from the container to the main apron, said auxiliary apron being adjustable to provide for expansion after its insertion in said opening, to bring portions thereof into engagement with the walls of said opening to prevent leakage of the material.

8. In apparatus for unloading pulverulent, granular and similar materials from mobile vehicles having a discharge opening, a conveyer; an apron for conducting the material to said conveyer; an auxiliary apron for conducting the material from said opening to the main apron, said auxiliary apron comprising a pair of collapsible members arranged to be introduced into said discharge opening; and means engageable with said main apron for spreading said collapsible members to bring portions thereof into engagement with the walls of said opening to prevent leakage of the material.

9. In apparatus for unloading pulverulent, granular and similar materials from mobile vehicles having a discharge opening, a conveyer; an apron for conducting the material to said conveyer; an auxiliary apron for conducting the material from said opening to the main apron, said auxiliary apron comprising a pair of pivotally connected members arranged to be swung to a collapsed position in which they may be readily introduced into said opening; hook members carried by said main apron, detachably engageable with the members of said auxiliary apron; and threaded means on said hook members for producing longitudinal movement thereof to spread said auxiliary apron members and bring portions thereof into engagement with the walls of said opening to prevent leakage of the material.

In testimony whereof, we affix our signatures.

MILTON A. ROBLEE.
GEORGE HENRY KUNZ.